(12) United States Patent
Shatzkamer

(10) Patent No.: US 10,038,927 B2
(45) Date of Patent: Jul. 31, 2018

(54) OUT-OF-BAND SIGNALING AND DEVICE-BASED CONTENT CONTROL

(75) Inventor: Kevin Shatzkamer, Hingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 13/334,401

(22) Filed: Dec. 22, 2011

(65) Prior Publication Data

US 2013/0166690 A1    Jun. 27, 2013

(51) Int. Cl.

| | | |
|---|---|---|
| *H04N 21/258* | (2011.01) | |
| *H04N 21/262* | (2011.01) | |
| *H04N 21/414* | (2011.01) | |
| *H04N 21/433* | (2011.01) | |
| *H04N 21/422* | (2011.01) | |
| *H04N 21/6543* | (2011.01) | |
| *H04N 21/658* | (2011.01) | |
| *H04N 21/81* | (2011.01) | |
| *H04N 21/442* | (2011.01) | |
| *H04N 21/462* | (2011.01) | |

(52) U.S. Cl.
CPC ..... *H04N 21/262* (2013.01); *H04N 21/25891* (2013.01); *H04N 21/41407* (2013.01); *H04N 21/4331* (2013.01); *H04N 21/44222* (2013.01); *H04N 21/4622* (2013.01); *H04N 21/6543* (2013.01); *H04N 21/6582* (2013.01); *H04N 21/812* (2013.01)

(58) Field of Classification Search
CPC .. G06Q 30/0269; H04M 3/4878; H04W 8/18; H04W 88/08; H04W 88/182; H04W 28/14; H04L 67/28; H04L 67/2847; H04N 21/2223; H04N 21/4524; H04N 21/4532; H04N 21/63; H04N 21/633; H04N 21/647; H04N 21/25891; H04N 21/262; H04N 21/41407; H04N 21/4331; H04N 21/654; H04N 21/6582; H04N 21/44222
USPC ................ 709/219, 223–224, 232
See application file for complete search history.

(56) References Cited

U.S. PATENT DOCUMENTS

| | | | |
|---|---|---|---|
| 5,948,061 A * | 9/1999 | Merriman et al. ............ 709/219 |
| 7,248,861 B2 * | 7/2007 | Lazaridis et al. .......... 455/414.1 |
| 7,860,799 B2 * | 12/2010 | Russell et al. ................. 705/52 |
| 2001/0005382 A1 * | 6/2001 | Cave ........................ H04L 29/06 370/466 |
| 2004/0049537 A1 * | 3/2004 | Titmuss ....................... 709/203 |
| 2005/0128995 A1 * | 6/2005 | Ott ........................... H04L 67/28 370/349 |

(Continued)

*Primary Examiner* — Larry Donaghue
(74) *Attorney, Agent, or Firm* — Patterson + Sheridan, LLP

(57) ABSTRACT

Systems and methods for performing content control in a mobile network using an out-of-band signaling channel are disclosed. In one embodiment, content control may be performed on a network device by collecting usage data for media consumption and caching from a mobile device via an out-of-band channel; receiving the usage data at an intermediate device via the out-of-band channel; building a predictive user profile based on the usage data; determining a schedule for downloading content from one or more media servers based on at least the predictive user profile; and sending instructions to perform one of time-shifting or pre-positioning to the one or more media servers according to the schedule for downloading content via an out-of-band channel.

24 Claims, 5 Drawing Sheets

(56) References Cited

U.S. PATENT DOCUMENTS

| | | | |
|---|---|---|---|
| 2005/0266825 A1* | 12/2005 | Clayton | H04W 4/12 455/407 |
| 2005/0282571 A1* | 12/2005 | Oprescu-Surcobe et al. | 455/503 |
| 2006/0036750 A1* | 2/2006 | Ladd | G06F 9/44526 709/229 |
| 2007/0067794 A1* | 3/2007 | Russell et al. | 725/25 |
| 2007/0204314 A1* | 8/2007 | Hasek | H04N 7/17309 725/100 |
| 2007/0299737 A1* | 12/2007 | Plastina | G06Q 30/0207 705/14.1 |
| 2008/0059592 A1* | 3/2008 | Marsh | G06Q 10/107 709/206 |
| 2008/0168523 A1* | 7/2008 | Ansari et al. | 725/131 |
| 2008/0311889 A1* | 12/2008 | Dunko | H04L 67/20 455/414.1 |
| 2009/0125585 A1* | 5/2009 | Krishnaswamy | G06Q 30/02 709/203 |
| 2009/0135839 A1* | 5/2009 | Khasnabish | H04L 63/164 370/401 |
| 2010/0015926 A1* | 1/2010 | Luff | H04L 41/0604 455/67.13 |
| 2010/0161831 A1* | 6/2010 | Haas | G06F 15/173 709/235 |
| 2010/0191858 A1* | 7/2010 | Thomas | H04L 65/1069 709/231 |
| 2010/0242079 A1* | 9/2010 | Riedl | H04N 7/17318 725/115 |
| 2010/0312700 A1* | 12/2010 | Coulter | G06Q 20/02 705/42 |
| 2010/0332674 A1* | 12/2010 | van Gassel | H04L 67/104 709/231 |
| 2011/0019650 A1* | 1/2011 | van Niekerk | H04L 65/1069 370/338 |
| 2011/0040894 A1* | 2/2011 | Shrum, Jr. | H04L 65/4084 709/246 |
| 2011/0107379 A1* | 5/2011 | Lajoie | H04L 65/4076 725/87 |
| 2011/0153644 A1* | 6/2011 | Kosuru | G06F 21/6218 707/769 |
| 2011/0225417 A1* | 9/2011 | Maharajh | G06F 21/10 713/150 |
| 2011/0246633 A1* | 10/2011 | Khosravi | H04L 67/2819 709/223 |
| 2011/0289592 A1* | 11/2011 | So | G06F 21/10 726/26 |
| 2012/0023236 A1* | 1/2012 | Backholm | H04L 47/20 709/226 |
| 2012/0120813 A1* | 5/2012 | Johansson | G10L 19/22 370/249 |
| 2012/0149346 A1* | 6/2012 | Akhtar | G06F 17/30902 455/414.2 |
| 2012/0179833 A1* | 7/2012 | Kenrick | H04N 21/234309 709/231 |
| 2013/0067088 A1* | 3/2013 | Kern | H04L 63/0407 709/226 |
| 2013/0111038 A1* | 5/2013 | Girard | H04L 69/16 709/226 |

* cited by examiner

OUT-OF-BAND SIGNALING AND DEVICE-BASED CONTENT CONTROL

FIELD OF THE DISCLOSURE

This disclosure relates generally to mobile wireless networking, and specifically to systems and methods for using mobile wireless network information to modify media protocol performance.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. These applications use media protocols to stream media such as video and audio from media servers to client programs running on user devices. Example media protocols include adaptive bitrate (ABR) streaming, real time streaming protocol (RTSP), and real-time transport protocol (RTP). These protocols are designed to work efficiently over large and distributed networks such as the Internet.

DESCRIPTION OF EXAMPLE EMBODIMENTS

Overview

Figure 1:
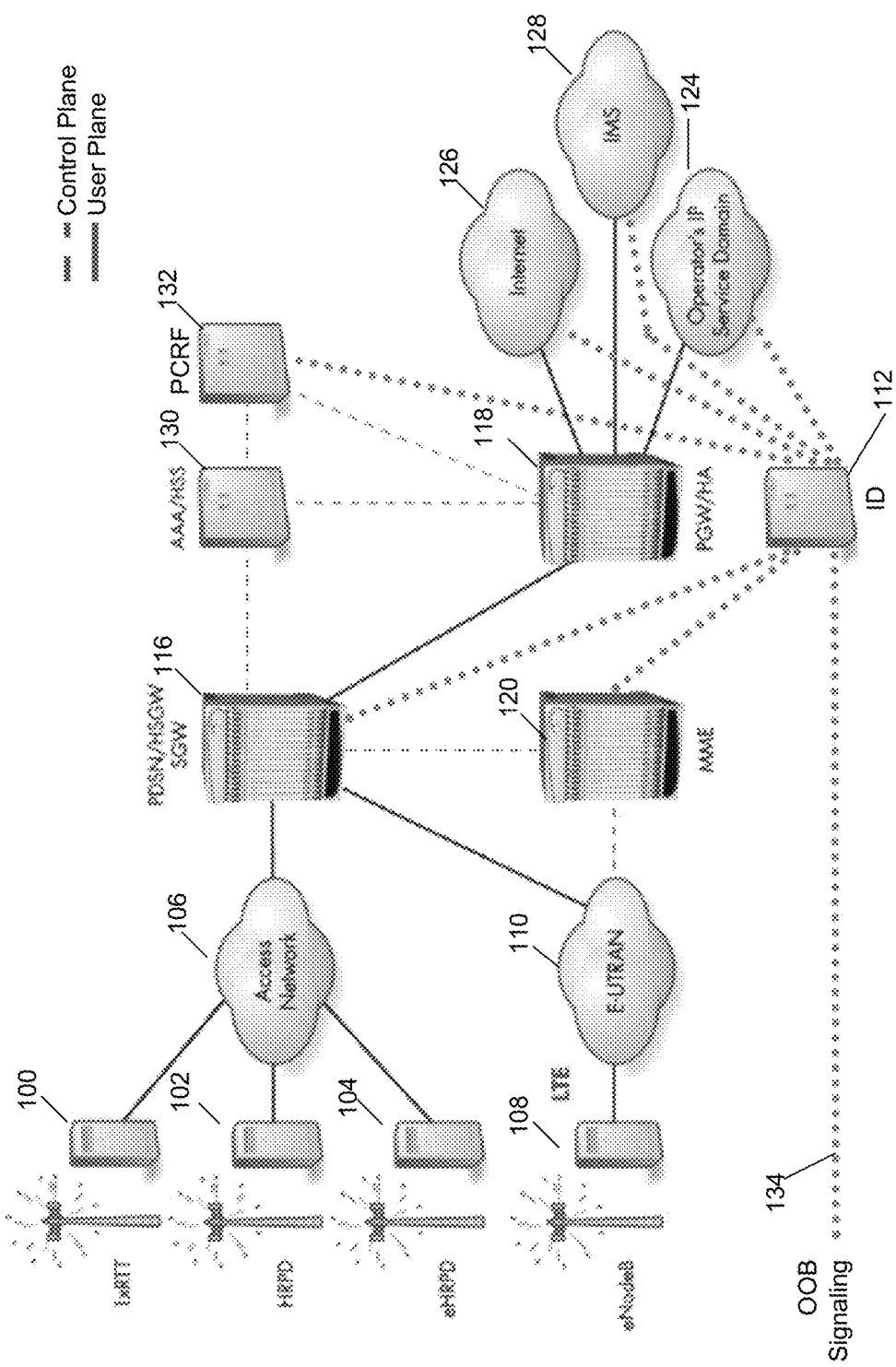
FIG. 1 illustrates an example communication network including a long term evolution (LTE) topology for media delivery enhancement in accordance with some embodiments.

Systems and methods for performing content control in a mobile network using an out-of-band signaling channel are disclosed. In one embodiment, content control may be performed on a network device by collecting usage data for media consumption and caching from a mobile device via an out-of-band channel; receiving the usage data at an intermediate device via the out-of-band channel; building a predictive user profile based on the usage data; determining a schedule for downloading content from one or more media servers based on at least the predictive user profile; and sending instructions to perform one of time-shifting or pre-positioning to the one or more media servers according to the schedule for downloading content via an out-of-band channel.

In another embodiment, content control may be performed on a network device that includes a processor, a memory, a first interface for communication with a mobile device via a first out-of-band channel, a second interface for communication with one or more media servers via a second out-of-band channel, and a signaling coordinator function in communication with the mobile device via the first interface and in communication with the one or more media servers via the second interface. The signaling coordinator function may be configured to receive media playback tracking information from the mobile device and may be configured to send one of prefetching, caching and downloading instructions to the one or more media servers based on the media playback tracking information. The first out-of-band channel and the second out-of-band channel may be channels that are not used to deliver media.

In another embodiment, content control may be performed on a mobile device that contains a processor for executing an application that display media to a mobile user; a local storage module for storing the application and storing one or more media files; a monitor function in communication with a mobile network using an in-band channel; and a signaling function in communication with a signaling coordinator function using an out-of-band channel, wherein the monitor function is operable to receive requests from the application for a media file and satisfy the requests from the local storage module and from the mobile network, wherein the monitor function is further operable to track media file usage, and wherein the signaling function is operable to communicate media file usage from the monitor function to the signaling coordinator function using an out-of-band channel.

Example Embodiments

Internet applications and services rely on a set of specific delivery methods to communicate video and audio multimedia over a network. As one example of communications using delivery methods, a user visits a video streaming web site using a user device. When the user chooses a video to view, a client program running on the user device contacts a video server on the Internet to request a video stream. The video server may request the video stream from a content server, or may request the video stream from an intermediate server. This intermediate server may also be a Content Distribution Network, responsible for distribution and delivery of media files. The video server ultimately streams the requested video to the client program on the user device using media protocols. Media files are generally relatively large in size and are often not downloaded all at once. Accordingly, web sites stream media, so that users will not have to wait for a lengthy download to complete. However, even with the decreased data throughput entailed by streaming, the bandwidth requirements of video often demand a significant portion of the capacity of today's networks.

Today's networks often look to ways to improve video traffic for delivery to a user device, or leveraging offloading of network resources (i.e., use of a service provider's WiFi network instead of a cellular data connection) as a means of reducing problems associated with video distribution.

This disclosure relates to an out-of-band signaling channel between the user device and the network infrastructure for time-shifting and smart caching. Time-shifting of content improves yield management by allowing content to be downloaded during specific time periods, such as when the network is not busy, or when a certain threshold is crossed. Smart caching relates to determining "cacheability" of content (i.e., whether a given content object can be stored for later access) on available storage on a user device. These benefits can be obtained by providing a mechanism for a network controller to manage resources available to a subscriber, including access to multiple networks (e.g., 3G, 4G, and WiFi) and available storage on the device, based on personalized profiles and network/content key performance indicators and thresholds.

This system can allow a mobile carrier to play a key role in content delivery, and can prioritize content based on subscriber usage patterns and viewing habits. As well, the system may mitigate the peak-to-trough delta resulting from high data transfer or network usage during busy hours and low usage during non-busy hours. Data transfer, network usage, and consumption may not always be aligned, and the use of this system allows the coordinator to provide Just-in-Time delivery based on consumption habits rather than transfer habits.

Two types of channels may be distinguished in a mobile content delivery system. An in-band channel may include a channel used specifically to deliver the content. In the case of 3GPP and other mobile networks, such channels may include the data plane of the mobile network. An out-of-band channel may include a channel that is not used to deliver content. Instead, it may provide a communications channel between network devices that may provide control capability. In the case of 3GPP and other mobile networks, such channels may include the control plane of the mobile network. The 3GPP model separates data and control planes by using different interfaces for different types of traffic. In this application, separation by interface is possible, but is not required. A variety of protocols for out-of-band channels may be used, such as eXtensible Messaging and Presence Protocol (XMPP), DOCSIS, Diameter, RTCP, and eXtensible Markup Language (XML).

Content may be served via an in-band channel from a streaming server or media server using a standard protocol, such as hypertext transfer protocol (HTTP), session initiation protocol (SIP), or RTSP. Content may also be served using an adaptive bitrate (ABR) protocol. An adaptive bitrate protocol provides different bit rates for content based on the available network bandwidth upon request. For example, a single video object may be provided at 128 kbps, 256 kbps, 512 kbps, 1 Mbps, and other bit rates. Adaptation can occur via signaling performed between a mobile node and the content server. When a mobile node makes a request for a content object, such as a television program or feature-length movie, the content server may respond with a list of chunks of the requested content, known as an index file, along with a list of each bit rate supported by a given chunk. There may also be a universal resource locator (URL) associated with each chunk/bitrate combination. The mobile node may then respond by selecting a chunk and a bitrate to identify the specific media file to be downloaded at that time. The mobile node may select a chunk by requesting the chunk directly from the URL contained in the Index file. The video server, in this instance, may be stateless.

Additionally, the bit rates can adapted to changing network conditions. Changing network conditions may cause the mobile node to request chunks of different bit rates. For example, if network conditions deteriorate, the mobile node may request that the next chunk of video be sent using a lower bitrate. Adaptive bitrate protocols may operate over standard protocols such as HTTP and RTSP.

Transcoding/transrating is employed by a media delivery system when a media file is requested for viewing at more than one bitrate. It may be performed in the mobile network or content delivery network or at a content server and enables adaptive bitrate delivery. There may be at least two types of transcoding/transrating: realtime (on-the-fly) and non-realtime. Non-realtime may used to store a number of different bitrate chunks. These chunks may not created dynamically. Realtime may be used more in a streaming model (non-ABR) where RTSP is used, as a means to adapt video to available network conditions. However, the RTCP receiver reports give information on transfer errors such as dropped packets, but not all other relevant conditions.

Time-shifting of content may refer to the use of off-peak time to download media, or fragments of media, for consumption at a later time. It may also refer to the user controlling the time at which the user consumes the content, where content that is ordinarily live-streaming or that requires access to a network server is downloaded to a local device for later consumption. A content provider may wish to permit a user to download most, but not all, of a given piece of content. Omitting pieces of a larger content stream discourages unauthorized copying of the content. This may also be considered time-shifting in some embodiments.

A type of time-shifting that reduces use demands on the network is trickle-casting or trickle-shifting. Trickle-casting refers to downloading one or more content objects at a slow rate during off-peak times to a user device. When the user is ready to consume a given piece of content, the content has already been downloaded to the user device.

Time-shifting is often implemented in conjunction with content viewing restrictions. In some cases, content providers may wish to prevent access to content at certain times, or to permit access to content at certain times. Alternately, content providers may wish to permit access to content only when the content has been fully downloaded to a user device.

Time-shifting may also be implemented in conjunction with load-shifting. Load-shifting can include the use of alternative networks to transmit data to a user device. In the case of mobile devices such as 3GPP-compliant mobile nodes, the device may be connected to a mobile network, but may also be connected to other networks such as Wi-Fi networks connected to cable Internet or enterprise Internet installations. In the case where a mobile node is connected to a bandwidth-limited or bandwidth-metered mobile network and also to an unlimited, high-bandwidth Wi-Fi network, it is preferable for the mobile network operator that the mobile node perform downloads over the Wi-Fi network. Alternately, if a mobile node is connected to a mobile network, and the mobile network is connected to or incorporates a content delivery network (CDN), such as a network provided by Akamai Technologies, it is preferable to use the CDN's content delivery and content caching capability in some cases, rather than to connect directly to a remote media server on the mobile network, to provide downloads of the media.

Certain embodiments may also be implemented in conjunction with smart caching technologies. Smart caching may include determining what portions of a media file to retain in cache and what portions to clear from the cache. This may include clearing some portions of a longer media file in order to prevent unauthorized copying. Smart caching may also include determining which media files to retain and which media files to clear from the cache. When using smart caching, the user device may request that chunks of media files that have been cleared from cache be retransmitted in a timely fashion, in order to allow the user to view the media without interruption. Smart caching may also be tied into transcoding/transrating and analytics as well, as described elsewhere in this disclosure.

Certain embodiments may also be implemented using analytics. Analytics may refer to one or more of a variety of techniques wherein content delivery and content consumption statistics are tracked, recorded or monitored for managing content delivery. This is performed without manual intervention by a user. For example, a user may be interested in watching a particular television series. Analytics may be applied to cache subsequent episodes of the television series on the user's device or on intermediate devices closer to the user. Analytics may also be used to predict the time that the user will want to watch the content, so that trickle-casting can be used to deliver the data to the user at a slow rate during off-peak hours, such as when the user is asleep or when the network has excess capacity. Analytics may also be used to predict or estimate peak usage times, peak usage locations, most popular media files, media files to be made available in certain regions, and other metrics for user consumption tracking and user activity.

Analytics may be implemented solely or partly on one or more network servers. In some embodiments, analytics may be facilitated using transmitted consumption information from the user device. In some embodiments, analytics may also include the creation, management and use of user profiles and profile information. By accumulating information about a user's consumption habits, network connectivity, and media preferences, a user profile may be used to enhance network media delivery. For example, client preferences for content may be used to enable a network operator to provide improved content availability based on correlated or aggregate popularity. Analytics may also be generated which correspond to mobility habits. For example, if a user is connected to WiFi at a certain time every day, a user profile might include this information. The user's connectivity to WiFi would be relevant when determining whether a given content download should be withheld to conserve 3G bandwidth.

Content may be pre-positioned closer to a mobile device or user device in some embodiments. This is related to the use of a load-shifting system, and relies on intelligently predicting usage of different parts of the network. If it is known that certain media files will be used by one or more users in a given region, cell, or domain, the relevant media files can be copied to an intermediate server located close to the given region, cell, or domain. A subsequent request for the media files may be handled by the intermediate server, not by an original content server or by a network server in a remote location. Performing pre-positioning thus reduces latency, improves throughput, and reduces the impact of the download on other networks. Pre-positioning is also a natural fit for the use of analytics, as described above. If user activity can be predicted, the impact of the user activity can be reduced.

The present systems and methods of media delivery enhancement may be used across different communication networks, including mobile networks such as GSM, GPRS, UMTS, and LTE; wireless networks such as Wi-Fi; or wired networks such as Local Area Network (LAN) or Wide Area Network (WAN). Similarly, the present systems and methods may be implemented on various technologies of the communication networks. Turning now to the figures, FIG. 1 illustrates a communication network that includes a media delivery enhancement mechanism in accordance with certain embodiments.

FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. As described above, the present media delivery enhancement may be implemented on any of these technologies. An evolved Node B (eNodeB) transceiver 108 is an LTE network radio network component that connects to an Evolved UMTS Terrestrial Radio Access Network (E-UTRAN) 110.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

In some embodiments, the media delivery enhancement mechanism can be implemented on an intermediate device (ID) 112. The ID 112 may be in communication with the access gateway 116, the MME 120, and various servers on the internet 126, the IMS 128, and the operator's IP service domain 124. The ID may be in communication with the anchor gateway 118 as well, in some embodiments. The ID may also be connected to the operator policy and charging rules function (PCRF) 132. The ID may use an out-of-band (OOB) channel to communicate with any or all of the above. The OOB channel may be a network link that is not part of the control plane or the user plane of the mobile communication network. The OOB channel may also be a virtual channel provided over the network used to provide media delivery, e.g., the OOB may be a standalone XMPP interface over the network that is not in concert with existing ABR or RTCP connections over HTTP. The ID 112 may also be connected to a mobile device via an OOB channel 134. The OOB channels between ID 112 and the nodes it is connected to may be different or may be the same. The ID 112 may be in communication with media servers, caching servers, streaming servers, or other servers that provide content services to a mobile user; these devices may be part of the Internet 126, IMS 128 or IP service domain 124, or they may be part of another network.

In some embodiments, media delivery services may be implemented on a gateway, such as PDSN/HSGW/SGW 116. The gateway 116 can access and maintain mobile system information relating to the mobile communication session, the mobile subscriber, the radio bearers, and the subscriber policies relating to the mobile communication session. The gateway 116 may be used to provide various services to a mobile device and implement the quality of service (QoS) on packet flows. The communication networks also allow provisioning of applications such as streaming video, streaming music, and other content delivered to a mobile node. Residing within the gateway can be one or more network processing units, line cards, as well as packet and voice processing cards. The below use cases can be implemented on various different combinations of gateways.

The Home Subscriber Server (HSS) 130 can be a master user database that supports various IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the mobile subscriber, the access control can involve granting or denying access to specific services, and the accounting that can take place is the tracking of the use of network resources by mobile subscribers. Other servers, such as the Home Location Register (HLR) can be used in other embodiments. The present media delivery enhancement may receive any of the mobile system information described above from the HSS, AAA server, or HLR to modify media protocol fragment requests. In certain embodiments, the AAA/HSS 130 can communicate with the access gateway 116 for charging purposes. In certain embodiments, the PCRF 132 may be wholly or partly responsible for the development of dynamic policies based on analytics that relate to mobility, consumption, QoS, and charging.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

Figure 2:
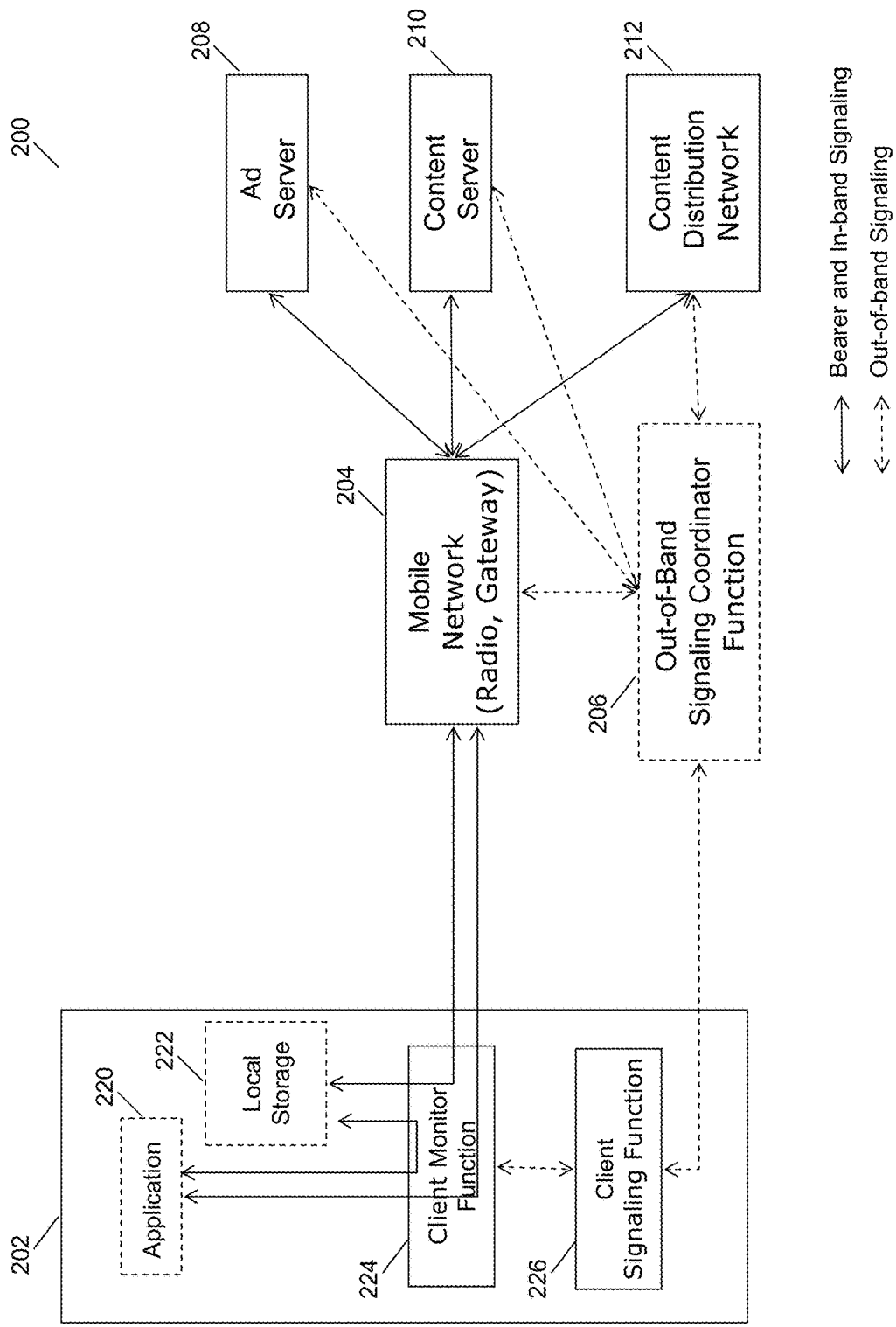
FIG. 2 illustrates a logical view of an example system for media delivery enhancement in accordance with some embodiments.

FIG. 2 shows a representative block diagram of certain embodiments of systems and methods described here. Media delivery enhancement mechanism 200 includes user device 202, mobile network 204, out-of-band signaling coordinator function 206, advertising server 208, content server 210, and content distribution network 212. The user device 202 may include a high-quality multimedia experience (HQME) client in certain embodiments. The user device 202 may be a user equipment (UE), or other mobile device on a mobile network, in communication with mobile network 204. The communication channel between user device 202 and mobile network 204 may be part of an in-band signaling network. The advertising server 208, content server 210, and content distribution network 212 may be used to serve content, including media, multimedia, audio and visual content, and advertisements, including video ads, audio ads, text ads, and multimedia ads.

In some embodiments, a client monitor function 224 is present on user device 202 and provides various functions, which may include analytics and/or a HQME client layer. The client monitor function 224 handles requests for media from application 220 and tracks and records consumption and usage information for media received from mobile network 204 via an in-band channel. The client monitor function 224 also communicates with HQME servers using one or more HQME interfaces, if HQME is supported. Functionality provided by the client monitor function 224 may include user authentication/authorization, providing content lists, providing content, providing content with digital rights management (DRM), queuing request handling, and device discovery. The HQME client is responsible for accessing and retrieving content from a HQME-compliant network server. The client monitor function 224 may provide similar functionality for non-HQME media servers. The client monitor function 224 may use local storage 222.

The client monitor function 224 on user device 202 may be in communication with a client signaling function 226, which communicates with an intermediate network device via an out-of-band channel. The out-of-band communication may use a subset of HQME such as a HQME-2 interface, if HQME is supported. The client monitor function 226 handles communication with the media server and is responsible for handling media, for saving/retrieving media from local storage, and for communicating media to user applications.

Signaling coordinator function 206 may reside on an intermediate device, and may be in communication with mobile network 204, advertising server 208, content server 210, and content distribution network 212 via an out-of-band signaling channel. The communications may include directives regarding pre-positioning content, information regarding user profiles or device profiles, instructions regarding caching of media and content, and information regarding advertising preferences. Communication between signaling coordinator function 206 and mobile network 204, advertising server 208, content server 210 and content distribution network may be via Diameter, XMPP or XML, or using another protocol. In some embodiments, signaling coordinator function 206 may be a stand-alone function, or may be co-located with one of a Mobile Network Gateway, an evolved packet data gateway (ePDG) or packet gateway (PGW), an IP multimedia subsystem (IMS) domain, a proxy call session control function (P-CSCF), a policy domain or PCRF, or other network nodes.

In some embodiments, the client monitor function 224 is in communication with out-of-band signaling coordinator function 206 on an intermediate network device. This device may be anywhere on the network. Signaling coordination function 206 may create, log and analyze analytics, network policies, content provider policies, user profiles, and network/CDN connectivity and characteristics. This device may use the above information to provide time-shifting, content caching, and pre-positioning, among other services, for facilitating media delivery. Multiple devices may talk to the same coordinator function.

In some embodiments, content server 210 is located in the network and stores content to be delivered to a user device. The content server is receptive to signals and messages sent from the signaling coordinator function on the intermediate network device over an out-of-band channel to perform pre-positioning of content, or to move content to a specified CDN. Multiple content servers may exist on the network, each responsive to the signaling coordinator function. In some embodiments, the content server may be part of a system that includes a workflow engine (not shown), responsible for the signaling and orchestration of content and metadata in the 210 domain. In such an embodiment, signaling coordinator function 206 would communicate with the workflow engine.

In some embodiments, signaling coordinator function 206 on the intermediate network device may send an out-of-band channel to user device 202 or an HQME client on user device 202 regarding a variety of media policies. The media policies may include how long a media file may be cached on the user device, how many times the media file can be viewed, on what devices the media file can be viewed, what quality or bitrate may be used, or other policies. The policy may come from the content domain 210. The policy may be sent to signaling coordinator function 206, then sent from signaling coordinator function 206 to client signaling function 226. The signaling coordinator function may both receive and send media policies. Signaling coordinator function 206 may also coordinate multiple policies, e.g., from a PCRF (not shown), from advertising server 208, from content server 210, from content distribution network 212, or from other sources.

In another embodiment, the coordinator function may communicate with an access network discovery and selection function (ANDSF) (not shown) as part of a long-term evolution (LTE) network. The purpose of the ANDSF is to allow a user equipment (UE) to discover non-3GPP access networks, such as WiFi networks, that may be used for communications. The coordinator function may communicate with the ANDSF in conjunction with the UE to facilitate handoffs and instructions to download over non-3GPP access networks.

Additional features may be possible in some embodiments. For example, content server 210 or other servers within mobile network 204 may be enabled to cache popular media files in each geographic locale. Content server 210 may be in communication with signaling coordinator function 206, which may also provides coordination regarding user devices. Advertising server 208 may be placed on the network to provide advertisements in communication with signaling coordinator function 206. Signaling coordinator function 206 may execute logic using user profiles to determine when to serve advertisements. Signaling coordinator function 206 may also use the functions described above to pre-position advertisements at certain network nodes for delivery to users. Advertisements may also be based on consumption tracking as described above on a per-user, per-device, or per-content file basis.

In one use case, signaling coordinator function 206 may be within intermediate device 112 (FIG. 1). When a client wishes to access a specific piece of content, the client requests the content from a network server (not shown), which communicates with the coordinator function via an out-of-band connection. Based on a popularity index, the number of subscribers who have requested the same specific content, or on other content consumption parameters, the coordinator function may request the content and pre-position the content closer to the aggregate subscriber location to facilitate transport. Pre-positioning may include downloading content from a media server to a node in mobile network 204. It may also be performed during periods of reduced network usage. Pre-positioning may also involve the use of a content distribution network such as content distribution network 212. The content may also be trickle-downloaded directly to user device 202 during periods of reduced network usage.

In another use case, a client wishes to store an entire file locally in order to view the file offline. This content is authorized to be cached with a set of parameters that determine behavior, including the length of time the content can be cached (i.e., a refresh interval), the number of devices/clients the content can be transferred to, rules regarding how advertising insertion or other advanced monetization schemes are to be handled (i.e., whether to download a particular set of advertising and insert the advertising into the video file). and the device types the content can be viewed on, i.e., if the mobile device has a high-definition multimedia interface (HDMI) out, the content provider may not want the content displayed on a high-definition TV (HDTV) and may prohibit this. Additional parameters may be used, and user profiles and/or device profiles may be created and stored either on the intermediate device or on user device 202, or both. The media policy may be received, correlated, and sent by signaling coordinator function 206.

In one embodiment, a controller determines how best to deliver content to the consumer using consumption models. The controller may continuously or periodically monitor consumption of content by the consumer, and subsequently use analytics based on collected data to determine how to deliver content to the consumer. Data collected may include time of consumption for a given media file, time of download, speed of download, connectivity to various networks, whether the user queued the file or selected it immediately prior to watching, bitrate of the media file, or other data. In an alternate embodiment, the controller may use a volume model to determine how best to deliver content, where a volume model may include information about network infrastructure, bandwidth and capacity between network nodes, and availability of bandwidth, including bandwidth at different times of day and under different usage scenarios.

In another embodiment, the client wishes to download a file, and the network may be near capacity or unable to meet the request. The coordinator function may notify the client of parameters for the specific piece of content via the out-of-band channel. These parameters may include delivery instructions to hand the content off to a local WiFi network for download, or may include instructions to download during a particular time window. Alternately, the coordinator function may store this request and subsequently notify the mobile device when resources are available to re-request content. The mobile device may download the content via an in-band channel.

In another embodiment, an end-user requests an entire playlist of content, either linked by personal preference/profile, based on popularity index, or "season"-length content. The coordinator function is operable to replicate playlist/profile and preferences and coordinate the transfer of content (either streaming, download/store, refresh, etc) based on a personal prioritization matrix, which may be developed via analysis of current and/or historical user media consumption behavior. This may include the development of a user profile and/or a device profile. This profile may be stored on an intermediate device, or may be stored on user device 202.

Figure 3:
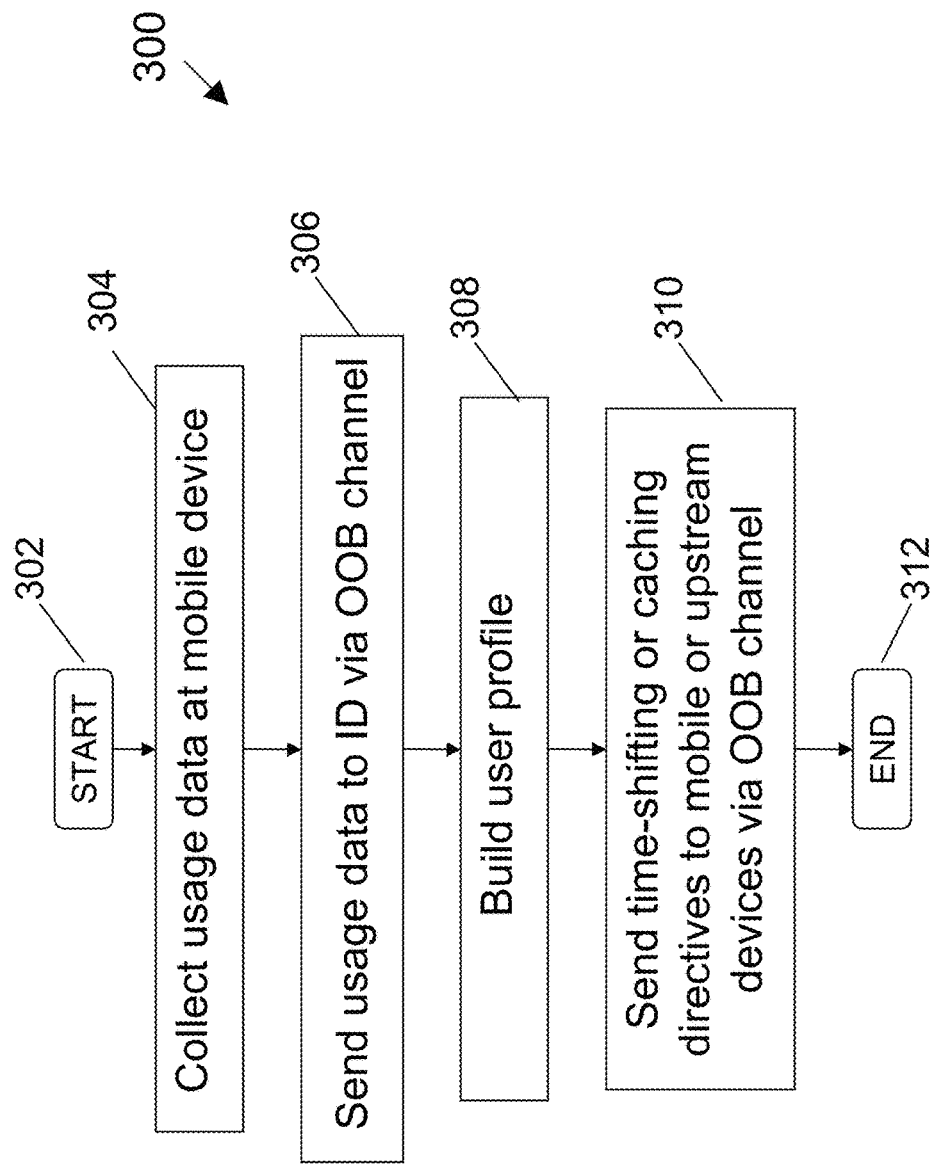
FIG. 3 illustrates a flow diagram of an example method for media delivery enhancement in accordance with some embodiments.

The media delivery enhancement mechanism can be implemented as shown in FIG. 3 in conjunction with FIG. 2. FIG. 3 illustrates a flow diagram of a method 300 for media delivery enhancement in accordance with some embodiments. FIG. 3 may include the following steps: collecting usage data at a mobile device at step 304, which may use a monitoring function such as client monitoring function 224; sending usage data to an intermediate device (ID) via an out-of-band channel at step 306, which may use client signaling function 226; building a user profile at step 308, which may occur on out-of-band signaling function 206; and sending time-shifting or caching directives to a mobile device or upstream devices via an out-of-band channel at step 310. The method 300 can then end at step 312.

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iOS, RIM'S Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment could also encompass other devices, such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The system for media enhancement described above may be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The media delivery enhancement gateway can be implemented as any combination of the following including an xGSN, an xGW, an xGW-SGW, and an xGW-PGW.

Figure 4:
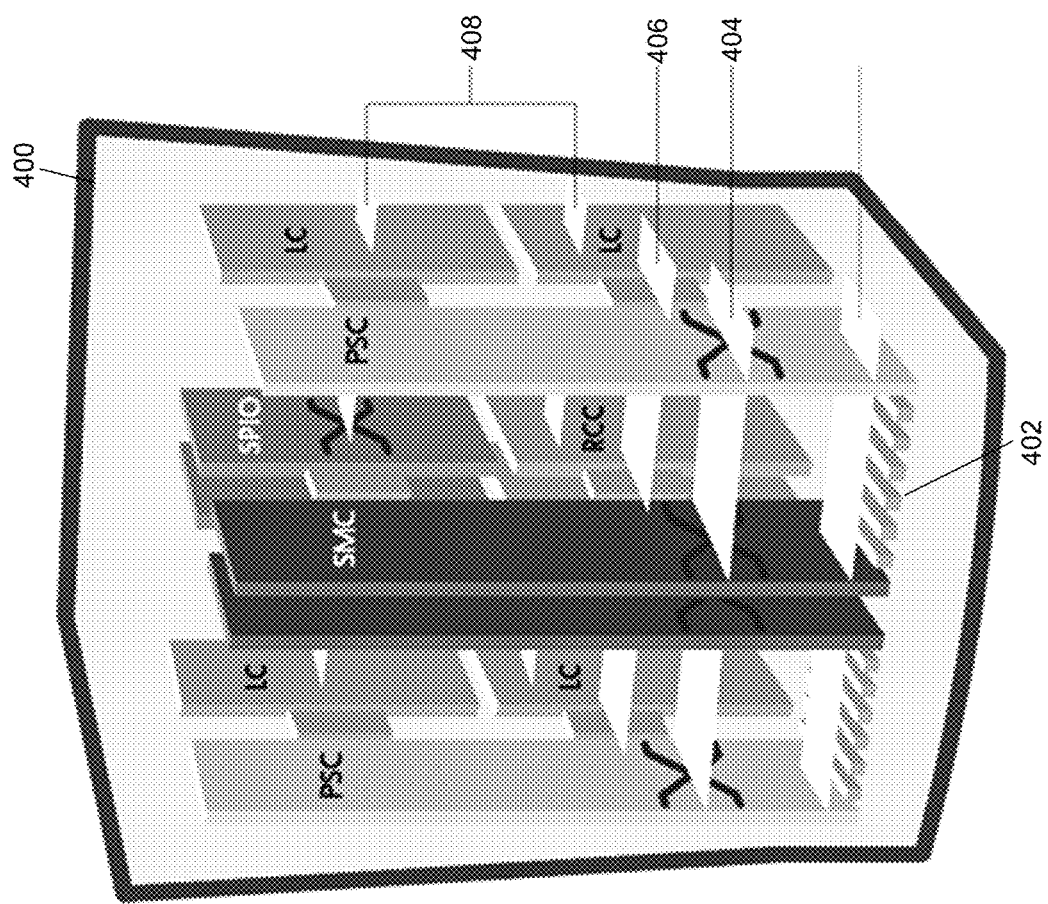
FIG. 4 illustrates an example network device configuration for media delivery enhancement in accordance with some embodiments.

In some embodiments the network device can be implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 4 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for several of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 5:
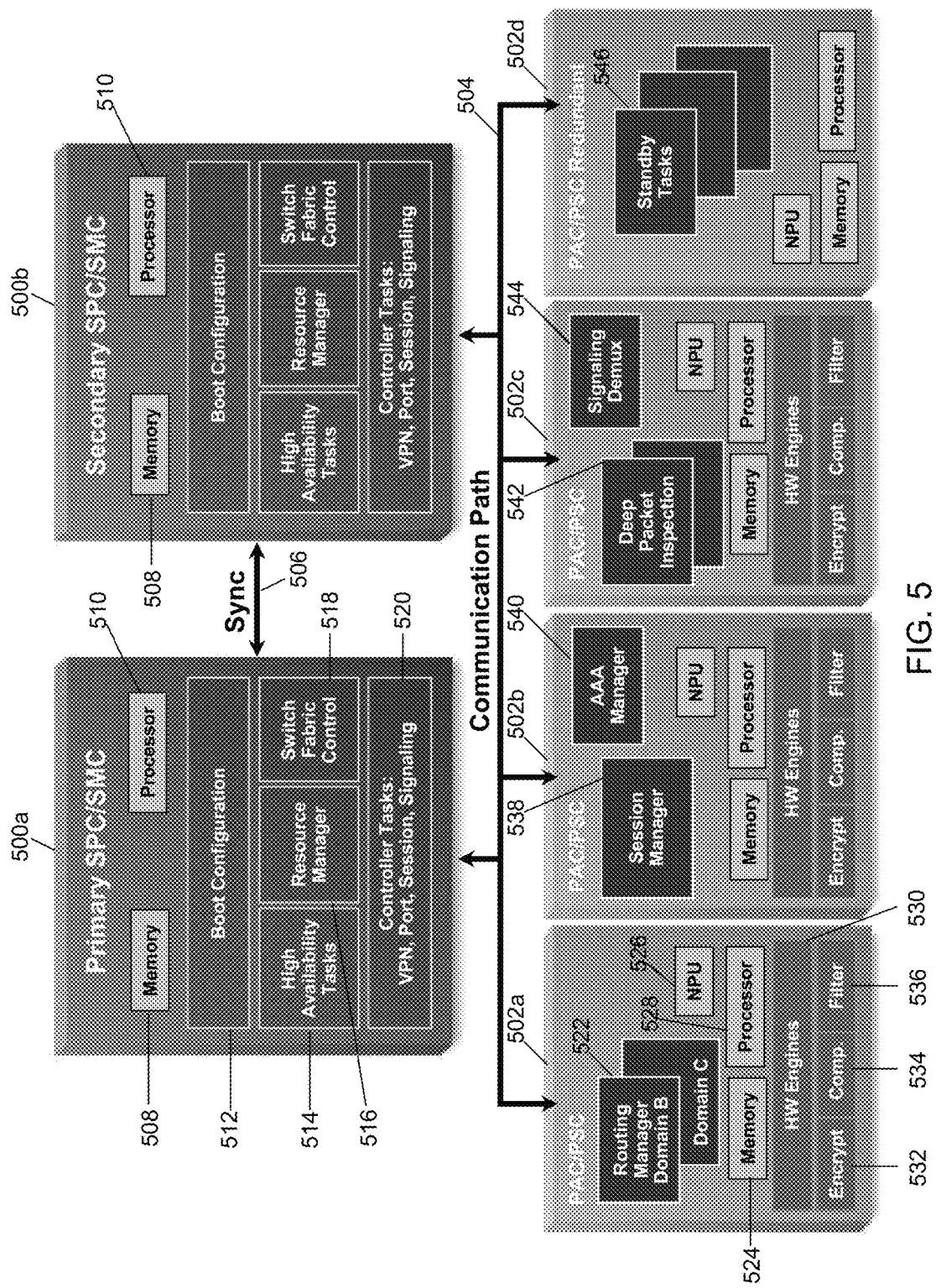
FIG. 5 illustrates an example architecture of a network device configuration for media delivery enhancement in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that utilize more processing power. FIG. 5 illustrates a logical view of the software architecture of a network device in accordance with certain embodiments. As shown, the software and hardware can be distributed within the network device and across different circuit boards, processors, and memory. FIG. 5 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502c provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the out-of-band channel may be implemented over a virtual channel over the public Internet.

We claim:

1. A network device to control content delivery based on out-of-band signaling and media consumption data rather than media transfer data, the network device comprising:
 one or more computer processors;
 a memory;

a first interface for communication with a mobile device via a first out-of-band channel;
a second interface for communication with one or more media servers via a second out-of-band channel; and
a signaling coordinator function in communication with the mobile device via the first interface and in communication with the one or more media servers via the second interface, the signaling coordinator function configured to:
receive, via the first interface, media consumption data specifying a time at which a media file, transferred to the mobile device via an in-band channel at an earlier point in time as specified by media transfer data, was subsequently watched by a user of the mobile device from the mobile device after a user delay; and
generate, based on the media consumption data, one of prefetching, caching or downloading instructions for content at the one or more media servers, wherein the instructions are sent to the one or more media servers via the second interface, whereafter the content is transferred to the mobile device based on the instructions, wherein the content is delivered to the mobile device based on the media consumption data in order to assess content delivery needs with a reduced measure of misalignment as compared to delivering the content based on media transfer data;
wherein the first out-of-band channel and the second out-of-band channel are configured to use a protocol that is different from a protocol used to deliver the content via the in-band channel to the mobile device.

2. The network device of claim 1, wherein the signaling coordinator function is configured to be in communication via the second interface with one or more advertising media servers for providing advertising content to the mobile device.

3. The network device of claim 1, wherein the signaling coordinator function is configured to send instructions to the mobile device regarding an expiration schedule for cached media files.

4. The network device of claim 1, wherein the signaling coordinator function is configured to send instructions based on the media consumption data to the mobile device to download specific media files during periods of relative network inactivity.

5. The network device of claim 1, wherein the protocol used over the second out-of-band channel is one of extensible messaging and presence protocol (XMPP), data over cable service interface specification (DOCSIS), Diameter, and extensible markup language (XML).

6. The network device of claim 1, wherein the mobile device is a user equipment (UE) and the mobile device is in communication with the one or more media servers via a long term evolution (LTE) mobile network.

7. A computer-implemented method to control content delivery based on out-of-band signaling and media consumption data rather than media transfer data, the computer-implemented method comprising:
receiving, at an intermediate device and from a mobile device via an out-of-band channel, media consumption data specifying a time at which a media file, transferred to the mobile device via an in-band channel at an earlier point in time as specified by media transfer data, was subsequently watched by a user of the mobile device after a user delay, wherein the out-of-band channel and the in-band channel are configured to use different protocols;
building a predictive user profile based on the media consumption data rather than the media transfer data;
determining, by operation of one or more computer processors and based on at least the predictive user profile, a schedule for downloading content from one or more media servers; and
generating, based on the schedule for downloading content, instructions to perform at least one of time-shifting and pre-positioning of the content at the one or more media servers, wherein the instructions are sent to the one or more media servers via the out-of-band channel, whereafter the time-shifted or pre-positioned content is transferred to the mobile device via at least the in-band channel, wherein the content is delivered to the mobile device based on the media consumption data in order to assess content delivery needs with a reduced measure of misalignment as compared to delivering the content based on media transfer data.

8. The computer-implemented method of claim 7, further comprising:
collecting additional usage data for advertising consumption; and
sending instructions to download advertisements to the mobile device to one or more advertising servers via the out-of-band channel.

9. The computer-implemented method of claim 7, further comprising sending instructions to the mobile device via the out-of-band channel regarding an expiration schedule for cached media files.

10. The computer-implemented method of claim 7, further comprising selecting a network device for caching media files for a user based on the predictive user profile and based on a network distance from the mobile device to the network device.

11. One or more non-transitory tangible media that include code executable to perform an operation to control content delivery based on out-of-band signaling and media consumption data rather than media transfer data, the operation comprising:
receiving, at an intermediate device and from a mobile device via an out-of-band channel, media consumption data specifying a time at which a media file, transferred to the mobile device via an in-band channel at an earlier point in time as specified by media transfer data, was subsequently watched by a user of the mobile device after a user delay, wherein the out-of-band channel and the in-band channel are configured to use different protocols;
building a predictive user profile based on the media consumption data rather than the media transfer data;
determining, by operation of one or more computer processors when executing the code, and based on at least the predictive user profile, a schedule for downloading content from one or more media servers; and
generating, based on the schedule for downloading content, instructions to perform at least one of time-shifting and pre-positioning of the content at the one or more media servers, wherein the instructions are sent to the one or more media servers via the out-of-band channel, whereafter the time-shifted or pre-positioned content is transferred to the mobile device via at least the in-band channel, wherein the content is delivered to the mobile device based on the media consumption data in order to assess content delivery needs with a reduced measure of misalignment as compared to delivering the content based on media transfer data.

12. The one or more non-transitory tangible media of claim 11, the operation further comprising:
  collecting additional usage data for advertising consumption; and
  sending instructions to download advertisements to the mobile device to one or more advertising servers via the out-of-band channel.

13. The one or more non-transitory tangible media of claim 11, the operation further comprising sending instructions to the mobile device via the out-of-band channel regarding an expiration schedule for cached media files.

14. The one or more non-transitory tangible media of claim 11, the operation further comprising selecting a network device for caching media files for a user based on the predictive user profile and based on a network distance from the mobile device to the network device.

15. A computer-implemented method for controlled content delivery based on out-of-band signaling and media consumption data rather than media transfer data, the computer-implemented method comprising:
  executing, by a mobile device, an application that displays media to a user;
  storing the application and storing one or more media files;
  generating, by operation of one or more computer processors, media consumption data specifying a time at which a media file, transferred to the mobile device via an in-band channel at an earlier point in time as specified by media transfer data, was subsequently watched by a user of the mobile device after a user delay, wherein the media consumption data is sent to the intermediate device via an out-of-band channel, wherein the out-of-band channel and the in-band channel are configured to use different protocols; and
  downloading, via the in-band channel, at least one additional media file specified by the intermediate device and at a time specified by the intermediate device, wherein the at least one additional media file and the time for downloading are determined by the intermediate device based on the media consumption data rather than the media transfer data, wherein the content is delivered to the mobile device based on the media consumption data in order to assess content delivery needs with a reduced measure of misalignment as compared to delivering the content based on media transfer data.

16. The computer-implemented method of claim 15, wherein the mobile device is a user equipment (UE).

17. The computer-implemented method of claim 15, further comprising receiving directives from the intermediate device to perform low bitrate downloads during network off-peak periods.

18. The computer-implemented method of claim 15, further comprising receiving directives from the intermediate device to store media files in a local storage module of the mobile device and to delete media files from the local storage module.

19. The computer-implemented method of claim 7, wherein both time-shifting and pre-positioning of the content are performed at the one or more media servers, wherein the time-shifted and pre-positioned content is transferred to the mobile device via a plurality of distinct networks, wherein the time-shifting of the content permits the content to be downloaded during a specific time determined based on one or more current network conditions, wherein the pre-positioning of the content permits the content to be cached on the mobile device for subsequent use, wherein the time of watching the media file is different from the time of downloading the media file, wherein the media file comprises a first media file, wherein the content comprises a second media file different from the first media file.

20. The computer-implemented method of claim 19, wherein the predictive user profile is built based further on content popularity and subscriber media preferences, wherein the computer-implemented method further comprises:
  collecting additional usage data for advertising consumption;
  sending instructions to download advertisements to the mobile device to one or more advertising media servers via the out-of-band channel;
  sending instructions to the mobile device via the out-of-band channel regarding an expiration schedule for cached media files; and
  selecting a network device for caching media files for a user based on the predictive user profile and based further on a network distance from the mobile device to the network device.

21. The computer-implemented method of claim 19, wherein the media consumption data further specifies the specific time to download and a specific speed of download of the media file, wherein the specific time to download is based on an estimated time that the at least one additional media file will be watched by the user, wherein the specific time to download is determined based further on a history of network accesses of the mobile device.

22. The computer-implemented method of claim 21, wherein the media consumption data is generated by and transmitted from a monitor function executing on the mobile device and to a signaling coordinator function executing on the intermediate device, wherein the signaling coordinator function is configured to generate the instructions to perform time-shifting and pre-positioning, wherein the mobile device is configured to:
  receive directives from the intermediate device to perform low bitrate downloads during network off-peak periods; and
  receive directives from the intermediate device to store media files in a local storage module of the mobile device and to delete media files from the local storage module.

23. The computer-implemented method of claim 22, wherein the signaling coordinator function is further configured to generate instructions based on the media consumption data and send the instructions to the mobile device to download specific media files during periods of relative network inactivity;
  wherein the media consumption data on which the predictive user profile is based is aggregated over two or more users regarding one or more media objects, the two or more users including the user.

24. The network device of claim 23, wherein the mobile device is a user equipment (UE), wherein the mobile device is in communication with the one or more media servers via a long term evolution (LTE) mobile network, wherein the protocol used over the out-of-band channel is, in respective instances, extensible messaging and presence protocol (XMPP), data over cable service interface specification (DOCSIS), Diameter, and extensible markup language (XML).

* * * * *

UNITED STATES PATENT AND TRADEMARK OFFICE
CERTIFICATE OF CORRECTION

| | | |
|---|---|---|
| PATENT NO. | : 10,038,927 B2 | Page 1 of 1 |
| APPLICATION NO. | : 13/334401 | |
| DATED | : July 31, 2018 | |
| INVENTOR(S) | : Kevin Shatzkamer | |

It is certified that error appears in the above-identified patent and that said Letters Patent is hereby corrected as shown below:

In the Specification

In Column 10, Line 61, delete ". and" and insert -- , and --, therefor.

In Column 14, Line 62, delete "Diffsery" and insert -- Diffserv --, therefor.

In the Claims

In Column 20, Line 57, delete "network device" and insert -- "computer-implemented method" --, therefor.

Signed and Sealed this
Eighth Day of January, 2019

Andrei Iancu
*Director of the United States Patent and Trademark Office*